Figure 1:
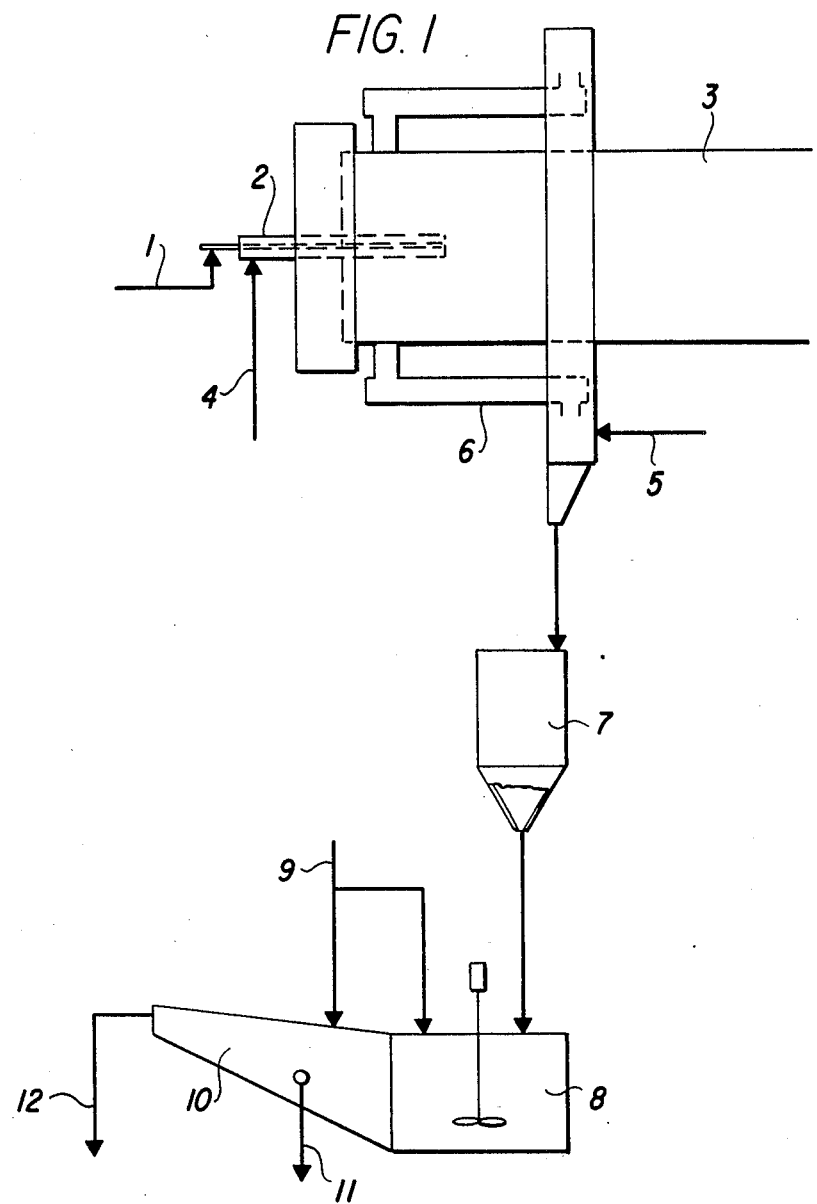

_United States Patent_ [19]

Olauson

[11] Patent Number: 4,606,722

[45] Date of Patent: Aug. 19, 1986

[54] FIRING OF LIME SLUDGE REBURNING KILNS WITH A SOLID FUEL

[75] Inventor: Lars G. Olauson, Angered, Sweden

[73] Assignee: AF-Industrins Processkonsult AB, Stockholm, Sweden

[21] Appl. No.: 683,138

[22] Filed: Dec. 18, 1984

[30] Foreign Application Priority Data

Dec. 21, 1983 [SE] Sweden .................................. 8307080

[51] Int. Cl.$^4$ ............................................. F27B 15/00
[52] U.S. Cl. ..................................... 432/14; 106/100; 432/105
[58] Field of Search ................. 423/177; 110/264, 347, 110/265, 341; 432/1, 14, 105; 106/100, 103

[56] References Cited

U.S. PATENT DOCUMENTS

| | | |
|---|---|---|
| 3,203,761 | 8/1965 | Neuville .............................. 432/1 X |
| 3,271,015 | 9/1966 | Mahony .............................. 423/177 |
| 3,345,052 | 10/1967 | Hall ....................................... 432/1 X |
| 4,259,081 | 3/1981 | Reuter et al. ..................... 423/177 X |
| 4,408,548 | 10/1983 | Schmalfeld et al. ............ 110/264 X |
| 4,462,794 | 7/1984 | Pfeffer et al. .......................... 432/14 |
| 4,473,014 | 9/1984 | Dejanovich ......................... 110/264 |

_Primary Examiner_—Edward G. Favors
_Attorney, Agent, or Firm_—Burns, Doane, Swecker & Mathis

[57] ABSTRACT

A method of firing a lime sludge reburning kiln with a solid fuel at reburning of lime sludge (CaCO$_3$) to burnt lime sludge is described. The solid fuel is gasified under supply of air to form hot flue gases in a cyclone gasifier, which is built in conjunction with the lime sludge reburning kiln, at a temperature in excess of 1000° C., at which temperature ashes formed melt, after which the molten ashes are separated, preferably into the burnt lime sludge within the lime sludge reburning kiln.

10 Claims, 3 Drawing Figures

FIRING OF LIME SLUDGE REBURNING KILNS WITH A SOLID FUEL

This invention relates to firing of lime sludge reburning kilns with gasified solid fuels.

By lime sludge reburning kilns such rotary furnaces are intended as in preparation of pulps according to the sulphate or soda method are used for reburning lime sludge ($CaCO_3$) formed in causticizing to burnt lime (CaO).

Preparation of pulp from wood is usually carried out by cooking the wood according to the sulphate or soda method.

In the cooking process which can be carried out in a continuous or batch-type plant, wood is charged together with a cooking liquid consisting of NaOH and $Na_2S$ (in the sulphate method), the major portion of the lignin contents of the wood being dissolved. Thereafter the pulp formed in the cooking is purified by washing in a second step. In order to achieve a satisfactory quality the washed pulp is often treated by screening and bleaching with different bleaching chemicals.

After treatment the finished pulp is led to a pulp dryer or direct, to a paper mill.

The spent liquor derived from pulp washing contains dissolved wood substances and the chemicals charged in cooking. For recovery of these, the spent liquor is usually concentrated by evaporation of the major portion of its water contents in an evaporation plant, after which the spent liquor is burnt in a so-called recovery boiler where the chemicals charged are recovered in the form of $Na_2CO_3$ in a so-called green liquor. Depending on the choice of cooking method $Na_2S$ may also be found in the green liquor.

To make it possible to recycle the recovered chemicals in the cooking process the $Na_2CO_3$ contents of the green liquor must be converted into NaOH. This is usually carried out by treatment of the green liquor with burnt lime (CaO) in the so-called causticizing reaction.

$$Na_2CO_3 + CaO + H_2O \rightarrow 2NaOH + CaCO_3$$

In order to close the recycle the lime sludge ($CaCO_3$) formed must then be converted into burnt lime (CaO) by so-called lime sludge reburning in a lime sludge reburning kiln according to the following reaction sequence.

$$CaCO_3 + Energy \rightarrow CaO + CO_2$$

As indicated above this lime sludge reburning is usually carried out in rotary tubular lime sludge reburning kilns, into which cold water-containing lime sludge is passed in counterflow to flue gases generated in the opposite end of the kiln, usually by combustion of oil or natural gas. The lime sludge undergoes the following reactions in sequence in the kiln: drying, heating and reburning, the temperature of emerging burnt lime generally being about 1200°–1400° C.

In view of the high energy costs attempts are constantly being made in the pulp industry to improve the energy economy, and preferably then also to reduce the need of oil. In recent years the total heat economy has been successively improved. A consequence of this has been that a large portion of the total need of oil of the pulp industry now is required in the lime sludge reburning kilns.

Changed methods of collection of wood mean that many pulp industries will have an increased access to wood fuels. Therefore it should be advantageous if the pulp industry could utilize solid fuels, e.g. for the firing of lime sludge reburning kilns. By solid fuels preferably fuels of the type, wood, bark, wood waste and peat are intended, but also coal and other solid fuels may be concerned.

However, at tests of firing solid fuels, e.g. in the form of powder, directly in the lime sludge reburning kiln it has been found that a large portion of the contents of the fuel of silicon and aluminum will get into the cycle of chemicals of the plant, where they create problems, e.g. by incrustation in evaporators.

In today's closed pulp industries the natural bleeding of these substances is not enough to ensure disturbance-free operation. Therefore different methods for increasing the bleeding have been discussed in literature. However, all these methods involve increased investment and operation costs.

Moreover, it is known at firing of lime sludge reburning kilns with fuel in the form of powder that the silicon and aluminum problem can be eliminated by gasifying the fuel in solid or fluidized bed gasifiers. After a thourough dust purification of the flue gases the addition of ashes to the lime sludge reburning kiln is indicated to be low enough for the normal bleeding mechanisms of the cooking and recovery system to suffice in order to avoid incrustation problems.

A separate gasification plant means, however, an additional complication and cost in comparison with firing of powder directly in the lime sludge reburning kiln. Moreover, the heat economy is impaired since no gasification process can operate without losses of energy.

At Lövholmens Bruk in Piteå, Sweden the oil for firing the lime sludge reburning kiln has been replaced with dried and finely ground powder from bark and wood waste. The powder is blown to two lime sludge reburning kilns from a pocket for dried fuel and into the lime sludge reburning kilns in specially built powder burners.

Moreover, this procedure is associated with the problems indicated above due to aluminum and silicon in the ashes of the powder, which ashes get into the burnt lime, after which silicon and aluminum are released in the causticizing process. Released silicon and aluminum with then cause problems by incrustation, deteriorated sedimentation properties etc. in the cooking plant and the recovery systems.

It is also known that lime sludge reburning kilns can be fired with black coal in gasifiers of the type including stationary bed. The gasifiers are separated from the lime sludge reburning kiln and the gas formed is led to combined gas oil burners after separation of dust.

Systems for gasification of bark, wood and wood fuel for gas firing of lime sludge reburning kilns are also being developed. The technique which is being developed is gasification in a separate fluidized bed gasifier at a temperature of 800°–900° C.

Still there is a need of an improved process for firing lime sludge reburning kilns with a solid fuel, which process is not associated with the problems due to aluminum and silicon in the ashes indicated above but still is economic and simple to carry out.

Accordingly the present invention relates to an improved process for firing lime sludge reburning kilns with a solid fuel comprising gasification of the fuel with a subsequent direct final combustion in the lime sludge reburning kiln.

More specifically the invention relates to a method for firing a lime sludge reburning kiln with a solid fuel when reburning lime sludge ($CaCO_3$) to burnt lime sludge (CaO) in said lime sludge reburning kiln, in which kiln cold aqueous lime sludge is introduced at one end and is reburnt in counterflow to hot flue gases formed at the opposite end of the kiln, said method comprising gasification of the solid fuel under supply of air for formation of the hot flue gases, and being characterized in that the gasification of the solid fuel is achieved in a cyclone gasifier built in conjunction with the lime sludge reburning kiln at a temperature in excess of 1000° C., at which temperature ashes formed will melt; and that the molten ashes, which by the cyclone effect are collected on the walls of the gasifier, are separated. The cyclone gasifier is preferably in lying position.

Thus, the gasification of the fuel takes place in a cyclone gasifier directly connected to the lime sludge reburning kiln, which is operated with a combination of dried fuel and air supply providing a sufficient high temperature, viz. in excess of 1000° C., and preferably 1500°–2000° C. in order that ashes formed will melt and be caught by the walls of the cyclone. The supply of air to the cyclone gasifier corresponds to an air factor (for stoichiometric combustion) less than 1. The air factor lies preferably within the range of from 0.5 to 0.9. The remaining necessary air plus necessary air excess for a complete combustion are supplied as secondary air to the gas after its exit from the cyclone gasifier. Normally the secondary air is preheated against outcoming burnt lime for cooling of the lime and recovery of its heat contents.

According to a specially suitable embodiment of the invention the molten ashes from the cyclone are separated directly into the burnt lime within the lime sludge reburning kiln as it has surprisingly been found that formed slag has been deactivated in respect of the release of silicon and aluminum in green and white liquor. Therefore it is possible to allow the molten ashes to run down into the burnt lime with a following separation of ashes as gravel from the lime-slaker without release of silicon and aluminum. In this case no system for handling of ashes is required as the existing system for separation of calcareous gravel from the lime-slaker is sufficient also for the small amounts of ashes to be formed.

According to another embodiment of the invention the molten ashes can be collected in the periphery of the cyclone, be separated and e.g. be led to a water bath. Moreover, in this case the system must be supplemented with means for handling of the ashes.

According to the invention many advantages are obtained in comparison with known technology, some of which are discussed below.

When using this invention the energy cost will be heavily reduced as a cheaper, preferably domestic fuel can be used.

The problems of silicon and aluminum appearing at direct powder firing of the lime sludge reburning kiln will be eliminated by the deactivation of the contents of the ashes of silicon and aluminum obtained by the slag melting. Therefore formed slag can be taken out either as molten slag outside the lime sludge reburning kiln or as gravel in the lime-slaker if the molten slag is allowed to enter the lime sludge reburning kiln.

By building a slag forming cyclone gasifier in conjunction with the lime sludge reburning kiln the risks of clogging of gas lines with dust and tar are eliminated and a simpler, cheaper method not requiring so much energy for utilizing solid fuels in the lime sludge reburning kiln is obtained than what is obtainable with a separate gasification plant.

By the two-step combustion which is the consequence of a gasification followed by a final combustion within the lime sludge reburning kiln a reduction of the amount of nitrogen oxides formed is obtained in comparison with oil and powder firing.

As the gasification takes place under a strong turbulence and at a very high temperature a very rapid gasification is obtained thanks to which the cyclone gasifier can be made small and cheap.

Figure 2:
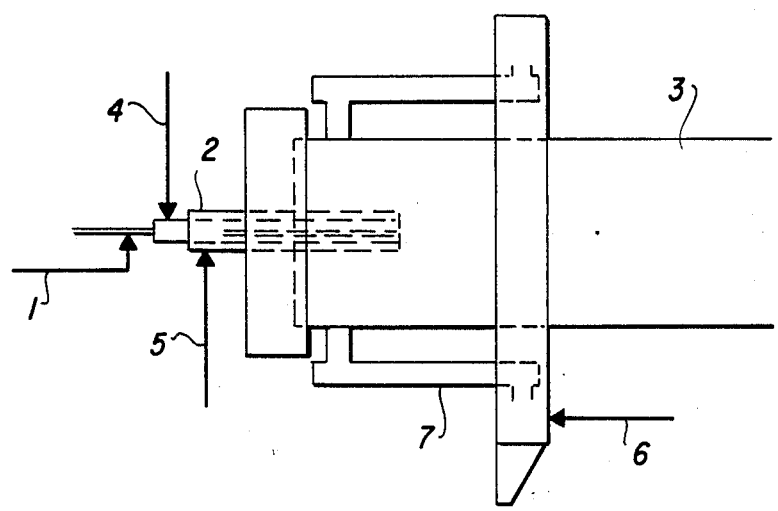
Figure 3:
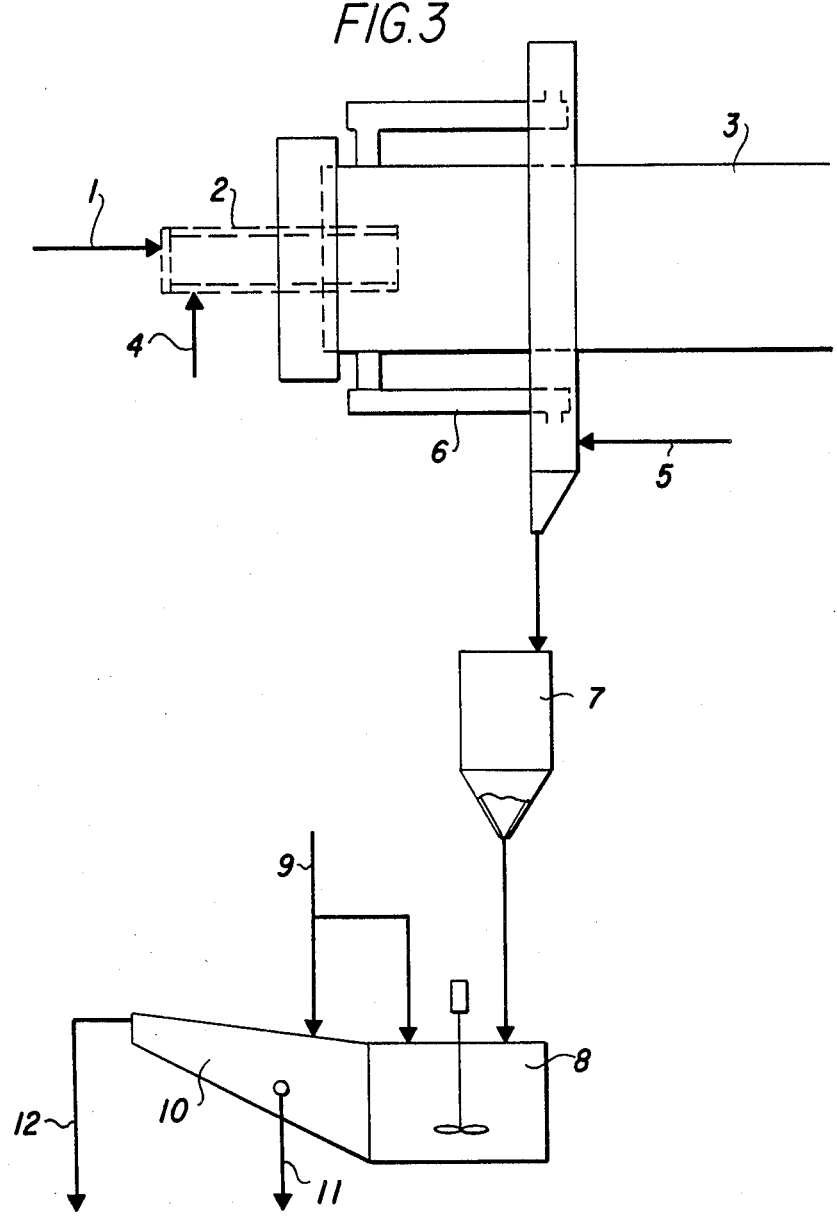

An embodiment of the invention is described more in detail in the following with reference to the drawings, in which FIG. 1 shows a conventional device for reburning lime sludge, the lime sludge reburning kiln being fired with oil, FIG. 2 shows a corresponding device, a combined gas/oil firing being utilized, and FIG. 3 shows a device according to the invention, a solid fuel being used.

The device shown in FIG. 1 illustrates the conventional way today of firing the lime sludge reburning kiln with oil. Oil is supplied through the line 1 to a burner 2 in the lime sludge reburning kiln 3. Primary air 4 for combustion and cooling is added in an air mantle arranged concentrically outside the oil line. Remaining air required is added as secondary air 5 to the lime cooler 6 of the lime sludge reburning kiln.

Outcoming burnt lime is first stored in a silo 7 for lime to which fresh lime is also being supplied. The lime is led from the silo to a lime slaker 8 where slaking is carried out with green liquor 9. Dead burnt lime, sand, gravel and other materials not reacting with the green liquor are thereafter separated through the line 12. The lime slaked in the green liquor is then led through the line 11 to a caustification vessel (not shown) for carrying out the causticizing reaction.

The device shown in FIG. 2 illustrates schematically another known procedure with a combined gas/oil firing of the lime sludge reburning kiln. The oil is then supplied through the line 1 to a burner 2 in the lime sludge reburning kiln 3.

The gas is supplied through the line 4 in a gas line concentrically arranged outside the oil line in the burner 2. Primary air 5 for combustion and cooling is supplied in an air mantle arranged concentrically outside the oil and gas lines. Remaining air required is supplied as secondary air 6 to the lime coolers 7 of the lime sludge reburning kiln.

Outcoming burnt lime is handled in the same way as described with reference to FIG. 1.

Instead of gas wood powder can also be supplied by blowing with air in a powder burner placed concentrically outside the oil burner.

In FIG. 3 a preferred embodiment of the invention is schematically shown.

Ground solid fuel is blown through the line 1 to a cyclone gasifier 2 in the lime sludge reburning kiln 3. Primary air for the gasification and cooling of the mantle of the cyclone gasifier is supplied through the line 4. The supply of air into the cyclone gasifier is thereafter carried out tangentially through apertures in the inner mantle. Secondary air for cooling of lime and final combustion of formed gas is added to a lime cooler 6 through line 5.

In the cyclone gasifier the ashes of the solid fuel are melted by means of a high temperature, after which the molten ashes through the effect of the cyclone are caught on the walls of the cyclone gasifier. The separation of the molten slag takes place within the lime sludge reburning kiln directly down into the burnt lime, which is led to a lime silo 7 after cooling in the lime cooler 6.

From the lime silo the lime and the molten ashes now solidified are led to a lime-slaker 8 where slaking is carried out with green liquor 9. The solidified ashes in the sorter 10 are thereafter separated together with the non-reactive material in the lime through the outlet 12. The slaked lime is then led through the line 11 to a caustification vessel (not shown).

EXAMPLE

In this example known art described with reference to FIGS. 1 and 2 is compared with a specially suitable embodiment of the invention described with reference to FIG. 3.

The control method A refers to reburning of lime sludge in a conventional oil-fired lime sludge reburning kiln as shown in FIG. 1. The control method B refers to lime sludge reburning under gas firing of the lime sludge reburning kiln as shown in FIG. 2 with gas from bark gasification prepared in an externally placed gasifier not forming slag. The method C refers to the method of the invention using bark as fuel.

A pulp mill for production of nonbleached sulphate pulp has been used with all three methods and the following data are based on the comparison:

| Pulp production | 1000 t/day (90%) |
|---|---|
| Oil consumption in a lime sludge reburning kiln | 40 t/day |
| Oil cost | 1800 Sw.Cr./t |
| Heat value of oil | 41.6 GJ/t |
| Heat value of bark | 19.2 GJ/t dry substance (DS) |
| Operation time | 330 days/year |
| Bark costs | 300 Sw.Cr./t DS |

The heat amount required to reburn the necessary bark amount is thus $$40 \cdot 41.6/24 = 69.3 \text{ GJ/h}$$

In control method B the lime sludge reburning is carried out with pyrolysis gas generated at a temperature below the melting and softening point of the ashes in externally placed equipment. For drying of the solid fuel from 45% dry content to 90% dry content in a separate drying plant of a simple type about 0.8 t DS/h of wood fuel is required. With an efficiency of gasification and combustion of 87% relative to oil the consumption of wood fuel will be $69.3/19.2/0.87 + 0.8 = 4.95$ t DS/h. The investment costs of drier, gasifier and combustion equipment are about 38 million Sw.crowns.

In method C (according to the invention) the gasification is carried out in a cyclone gasifier built in conjunction with the lime sludge reburning kiln for tapping of molten slag directly into the lime sludge reburning kiln the heat losses of the cyclone gasifier are reduced relative to oil to 92% which together with a drying need of 0.8 t of dry substance/h provides a consumption of wood fuel of $69.3/19.2/0.92 + 0.8 = 4.72$ t DS/h. The investment cost of a drier and a cyclone gasifier comparable to control method B is about 30 million Sw.Crowns.

The saving of fuel costs and investment costs for the two methods B and C in comparison with conventional oil firing technology (method A) are evident from the table below:

| | Fuel cost million Sw.Crs/year | Investment million Sw.Crs |
|---|---|---|
| Control method A | 23,8 | 0 |
| Control method B | 11,8 | 38 |
| Method C according to invention | 11,2 | 30 |

As is apparent from the above table considerable savings of fuel costs can be achieved, when using the invention, by utilizing a cheaper fuel.

In comparison with the best known technique (represented by control method B) both a saving of fuel costs and a reduced investment cost due to the simpler design are achieved.

What I claim is:

1. Method for firing a lime sludge reburning kiln with a solid fuel when reburning lime sludge ($CaCO_3$) to burnt lime sludge (CaO) in said lime sludge reburning kiln, in which kiln cold aqueous lime sludge is introduced at one end and reburnt in counterflow to hot flue gases formed at the opposite end of the kiln, said method comprising gasification of the fuel under supply of air to form the hot flue gases, and being characterized in that the gasification of the solid fuel is carried out in a cyclone gasifier built in conjunction with the lime sludge reburning kiln at a temperature in excess of 1000° C., at which temperature ashes formed melt; and that the molten ashes collected on the walls of the cyclone gasifier by the effect of the cyclone are separated.

2. The method of claim 1, characterized in that the cyclone gasifier is in a lying position.

3. The method of claim 1, characterized in that the molten ashes collected on the walls of the cyclone gasifier are separated into the burnt lime sludge within the lime sludge reburning kiln.

4. The method of claim 1, characterized in that the temperature in the cyclone gasifier is 1500°–2000° C.

5. The method of claim 1, characterized in that the ashes are separated in solid form from the lime together with non-reactive material in the lime after cooling of the molten ashes and burnt lime and slaking of the lime.

6. The method of claim 1, characterized in that the molten ashes are separated from the periphery of the cyclone gasifier.

7. The method of claim 6, characterized in that the separated molten ashes are cooled.

8. The method of claim 7, characterized in that the cooling is carried out in an aqueous bath.

9. The method of claim 1, characterized in that the supply of air in the cyclone gasifier corresponds to an air factor of less than 1.

10. The method of claim 9, characterized in that the air supply corresponds to an air factor of 0.5 to 0.9.

* * * * *